May 20, 1952     I. JEPSON     2,597,735
LAWN MOWER
Filed Sept. 13, 1946     5 Sheets-Sheet 1
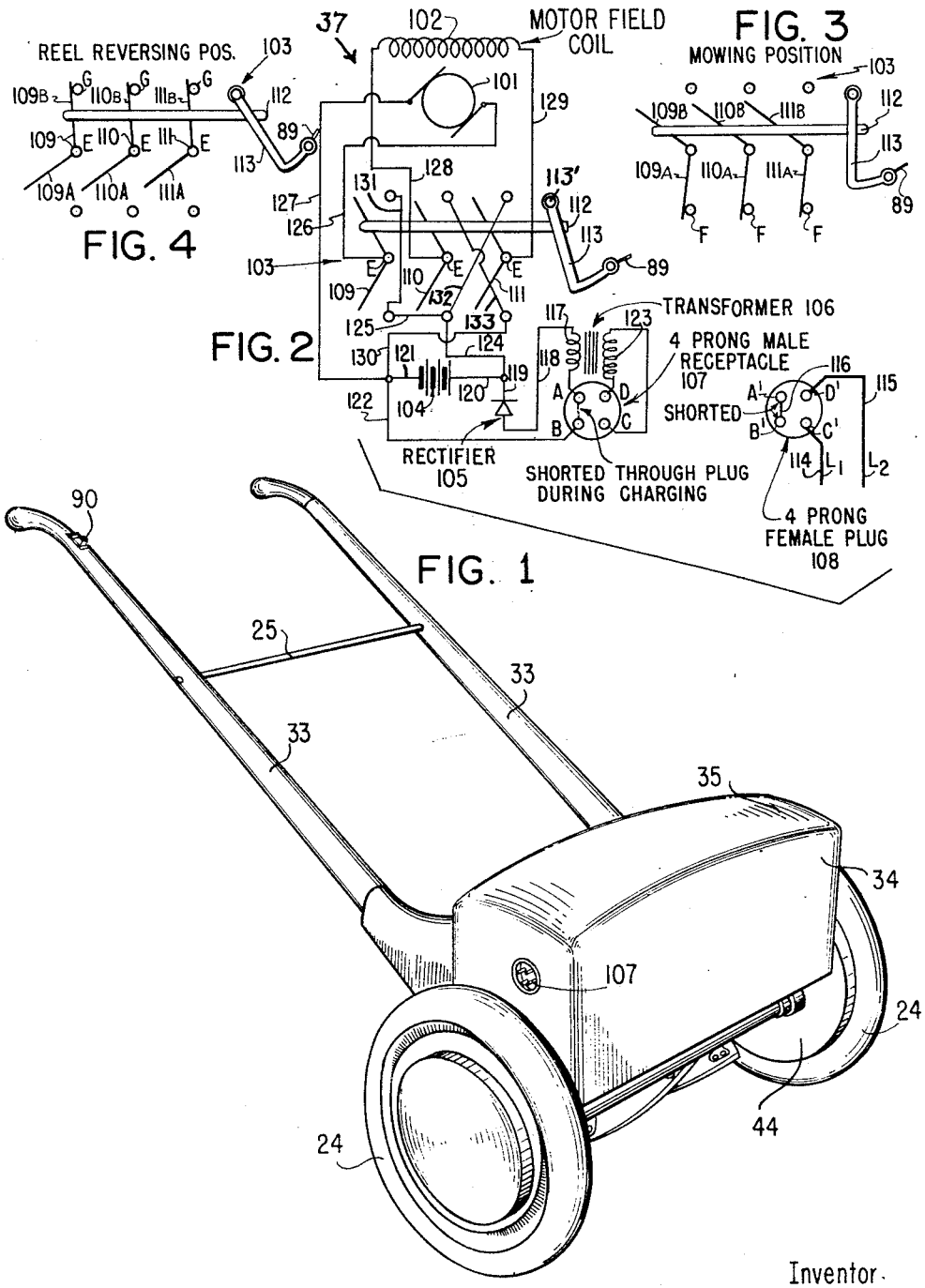
Inventor.
Ivar Jepson
By McCanna & Morsbach
Attorneys.

May 20, 1952　　　　　I. JEPSON　　　　　2,597,735
LAWN MOWER
Filed Sept. 13, 1946　　　　　　　　　　　5 Sheets-Sheet 2

Inventor
Ivar Jepson
By *McCanna & Morsbach*
Attorneys

May 20, 1952     I. JEPSON     2,597,735
LAWN MOWER

Filed Sept. 13, 1946     5 Sheets-Sheet 3

Inventor
Ivar Jepson
By
McCanna & Morsbach
Attorneys

Inventor
Ivar Jepson
By McCanna & Morsbach
Attorneys

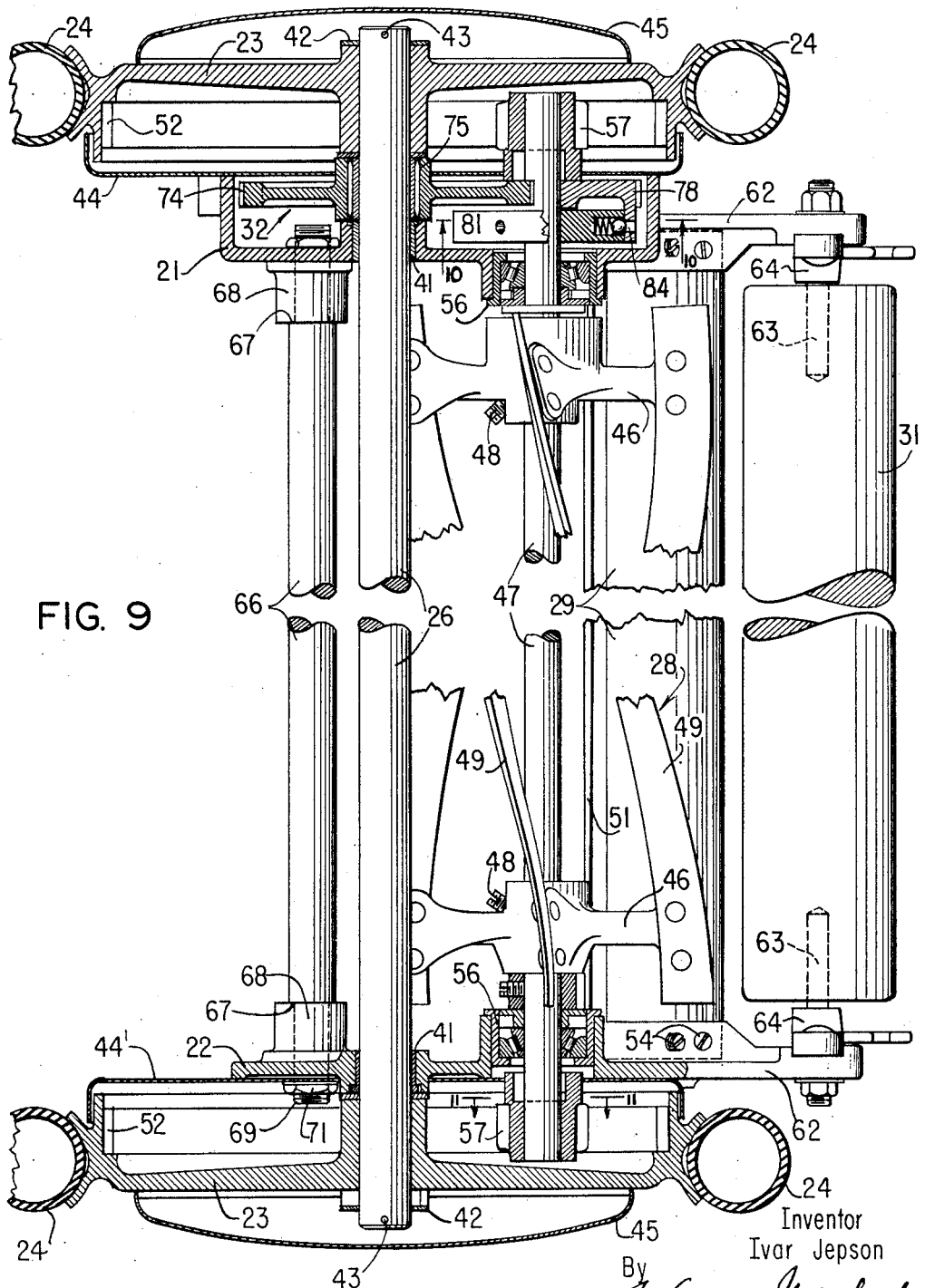

Patented May 20, 1952

2,597,735

UNITED STATES PATENT OFFICE 2,597,735

LAWN MOWER

Ivar Jepson, Oak Park, Ill., assignor to Sunbeam Corporation, Chicago, Ill., a corporation of Illinois Application September 13, 1946, Serial No. 696,679

16 Claims. (Cl. 56—26)

This invention relates to lawn mowers, particularly to power operated lawn mowers and has special reference to a battery powered, electric motor operated lawn mower. It will be seen, however, that many features of the invention are readily applicable to the conventional gasoline motor operated lawn mower.

In battery powered grass cutters there is a peculiar and vital problem of utilizing the stored electrical energy to the greatest extent so that it will be possible to mow a large area with a reasonable sized battery unit without recharging. The problem of efficient power utilization has not been of great importance with conventional gasoline motor operated mowers because they are simply provided with oversize power units to offset the inefficiency of the mower mechanism. But to overpower a battery unit to the extent necessary to offset the inefficiency of a conventional mower would require such an oversize battery that it would not be commercially feasible.

Accordingly, it is my object to provide a lawn mower construction particularly adapted to motor operation in which the efficiency of the power transmission mechanism is two or three times greater than in conventional mowers. With the efficiency increased to this extent, it is commercially practicable to operate the mower with a battery energized electric motor which will drive the mower over a large area equivalent to a good sized lawn without re-charge. The many advantages of such a mower with respect to quietness and simplicity of operation, contrasted with conventional motor driven mowers, are obvious.

One specific object of my invention lies in the arrangement of gearing which utilizes a single idler gear connecting a driving pinion with a driven pinion, the idler gear being rotatably mounted about the wheel axle for maximum compactness; this contributes to improved efficiency by minimizing the number of gear contacts.

Another object is the provision of a slip clutch arrangement in the gearing to permit the reel to be stopped without stalling the motor when the reel torque increases above a certain amount; this provides a safety feature which protects the power transmission mechanism from breakage in the event that a stone, stick, or other such object is caught between the reel and the ledger blade.

Another object is the provision of a support for the battery (which comprises the major part of the weight of the power unit) which is pivoted above the ground wheels and mounted rigidly on the operating handle; this allows the operator to maintain the center of weight over the point of contact with the ground whether it is going uphill or downhill. With this construction the weight load applied to the rearwardly positioned roller is only enough to hold down the rear of the mower and is not enough to create a useless drag that must be offset by extra power application to the wheels.

Another object is the provision of a power mower in which the driving means and means for transmitting power to the reel and ground wheels are all mounted on rigid frame means so that only a portion of the driving means torque reaction is effective to press the trailing roller downward onto the lawn thereby improving the efficiency of moving the mower across the lawn.

Other objects and advantages will become apparent from the following description in connection with the drawings, in which—

Figure 1 is a perspective view of a mower made in accordance with the present invention;

Fig. 2 is one form of wiring diagram which may be employed to energize the motor for forward or backward rotation and to recharge the battery when required, the control switch being shown in "neutral" or non-energizing position;

Fig. 3 is a partial view similar to Fig. 2, showing the control switch in "mowing" position;

Fig. 4 is a view similar to Fig. 3, showing the switch in "reel reversing" position;

Fig. 9 is an enlarged sectional view taken on line 9—9 of Fig. 6;

Figure 11:
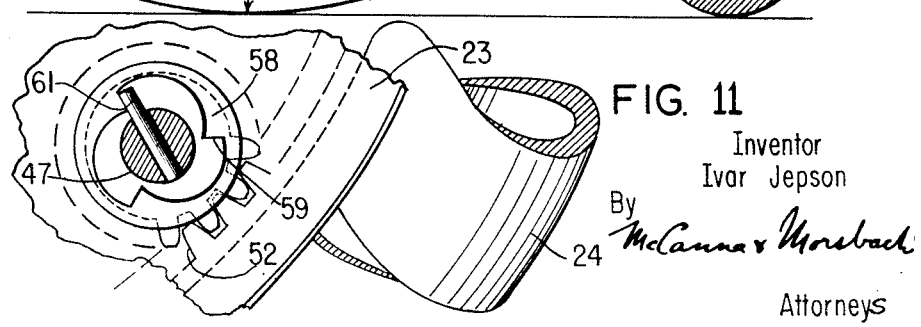
Figure 10:
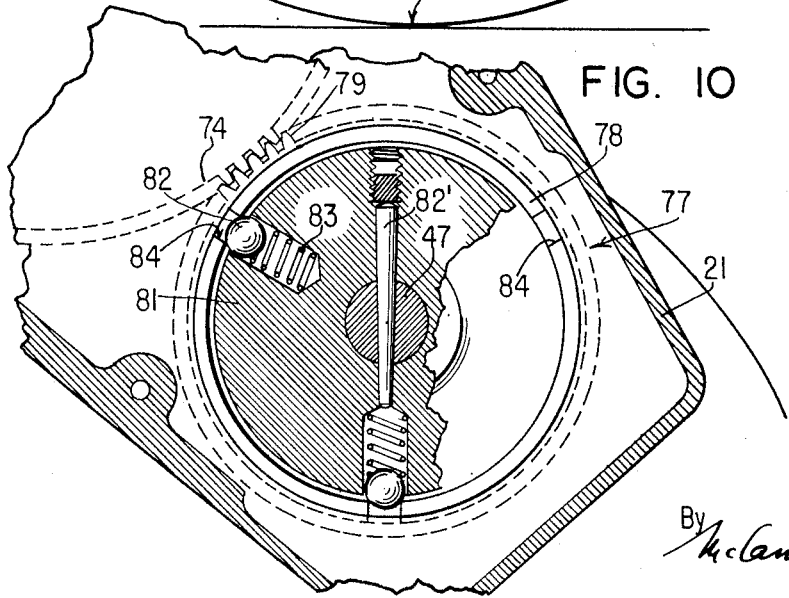

Fig. 10 is an enlarged sectional view taken on line 10—10 of Fig. 9 assuming Fig. 9 shows the complete structure showing the clutch mechanism that is provided to protect the gearing against overload caused by an object being caught between the reel and ledger bar, and Fig. 11 is an enlarged sectional view taken on line 11—11 of Fig. 9 assuming Fig. 9 shows the complete structure showing the internal pawl and ratchet mechanism employed in the pinions at the end of the reel shaft.

The embodiment chosen to illustrate the present invention includes a frame or frame means generally designated at 20 comprising a pair of side plates 21 and 22 held in fixed spaced relation by tie bar 66, the ground wheels 23 having the tires 24, the wheel axle 26 rotatably journaled in the side plates, handle yoke members 27 mounted in spaced relation upon the axle 26, a reel or rotatable cutter 28, a ledger bar 29 engageable by the reel, a trailing roller 31, and a system of gearing generally designated 32.

The handle yokes 27 carry a pair of handles 33 connected by tie rod 25 and serve to mount on the wheel axle 26 the heaviest part of the power unit, namely, the battery and certain auxiliary regenerating equipment to be described. The housing 34 having a removable cover 35 is mounted on the yokes 27 and supports the battery 36 and charger 40 and, for the sake of appearance, may also enclose the motor 37 which in the present instance is mounted on one of side plates. Thus, in this case, the battery, charger, etc., will be pivotal about the axis of the axle 26 independently of the motor because the motor itself is mounted directly on the side plate 21 by bolts 38. To permit this independent movement the walls of the battery box 34 will be spaced sufficiently from the motor on each side to permit them to clear the motor throughout limited pivotal movement of the handle 33, this pivotal movement being desirable to permit the operator to maintain the center of weight over the wheel-ground contact point 19 for maximum traction at all times to most effectively utilize the energy stored in the battery. This, and the improved gearing and other features subsequently to be described, constitute an important part of my invention in providing a structure capable of transmitting the maximum amount of power from the battery 36 to move the mower across the ground. The ends of the yoke members 27 are connected as by means of bolts 39 to the handles 33. In practice, separate bearing liners 41 will usually be provided in the side plates as trunnions for the wheel axle 26. The wheels 23 are mounted for rotation about the axle 26 and are held in place by means of washers 42 and pins 43, non-rotatable formed cover plates 44 and 44' being provided to act as a closure for the open or inner side of the wheels. Formed plates 45 are assembled by means of a press fit to the outside of the wheels to cover the ends of the axle 26.

The reel, previously designated 28, comprises a pair of spaced spiders 46 mounted on the reel shaft 47 as by means of set screws 48, the spiders supporting a plurality of curved cutting blades 49 which operate against the surface 51 of the ledger blade 29, the latter being pivotally adjustable about the pin 53 by means of the adjusting screws 54.

Opposed portions of the reel shaft 47 are journaled in the bearings 56 which in turn are mounted in the side plates comprising the frame means 20, the end portions of the reel shaft being provided with ratchet type pinions 57 which permit the mower to be pushed forward by hand without back driving the reel or motor, as will be described. The pinions 57 are meshed with the gear surface 52 formed on the interior of the wheels 23 to transmit power to the latter when the motor is rotated in the forward direction. This construction is well known except that the arrangement of parts is reversed from that conventionally employed in hand-operated mowers, and, as shown in Fig. 11, it comprises shank portions 58 having communicating members in the form of pawl and ratchet mechanisms which may conveniently comprise internal ratchet teeth 59 located in the shanks 58 and a pawl 61 slidably secured in the reel shaft 47.

As will usually be preferred, the rear parts 62 of the side plates comprising the frame means 20 will carry a suitable roller, previously designated as 31. It will be understood, however, that the roller 31 is not absolutely essential and may be omitted in some cases. The particular roller 31 illustrated has suitable rotatable mounting means comprising pins 63 mounted in the hollow bosses 64 which are attached to the side plates so that it may roll along the lawn in trailing relation to the ledger bar 29 and so that it may act as a third point of support in addition to the ground wheels to maintain the mower assembly in upright position when at rest. The side plates 21 and 22 are maintained in rigidly spaced relationship by means of the ledger bar 29 in the one instance and in the other instance by means of the tie rod 66 having the shoulders 67 abutting the hollow bosses 68 extending inwardly from the side plates, the ends of the tie rod being threaded, as at 69, and provided with a nut 71 which also serves to hold the cover plate 44' in place. The other cover plate 44 may be held in position by any suitable means.

The gearing previously designated generally as 32 comprises a driving pinion 72 mounted on the motor shaft 73, an idler gear 74 mounted rotatably about the wheel axle 26 and provided with roller bearings 75, and a driven pinion generally designated 77, and mounted upon the reel shaft 47. As shown in Fig. 10, the driving pinion 77 comprises two parts, an outer or hollow portion 78 having exterior gear teeth 79 engaged with the idler gear 74, and an inner or clutching portion 81 which is pinned to the reel shaft 47 by means of the pin 82'. The inner and outer portions of the driven pinion 77 are joined in torque transmitting relationship by means of the balls 82 pressed by springs 83 into holes 84 drilled in the gear-carrying portion 78. With this construction, at a maximum torque predetermined by the compression of the springs 83 and the extent to which the balls are seated in the holes 84, the gear-carrying outer portion 78 will rotate around the clutch portion 81, thereby permitting the motor pinion 72, the idler gear 74 and the outer portion 78 of the driven gear to rotate independently of the reel in case the latter is stopped by an obstruction. This provides an automatically declutching mechanism allowing the reel to be completely stopped by a stone or other obstruction caught on the ledger bar without stalling the motor or injuring the parts of the mower.

Figure 5:
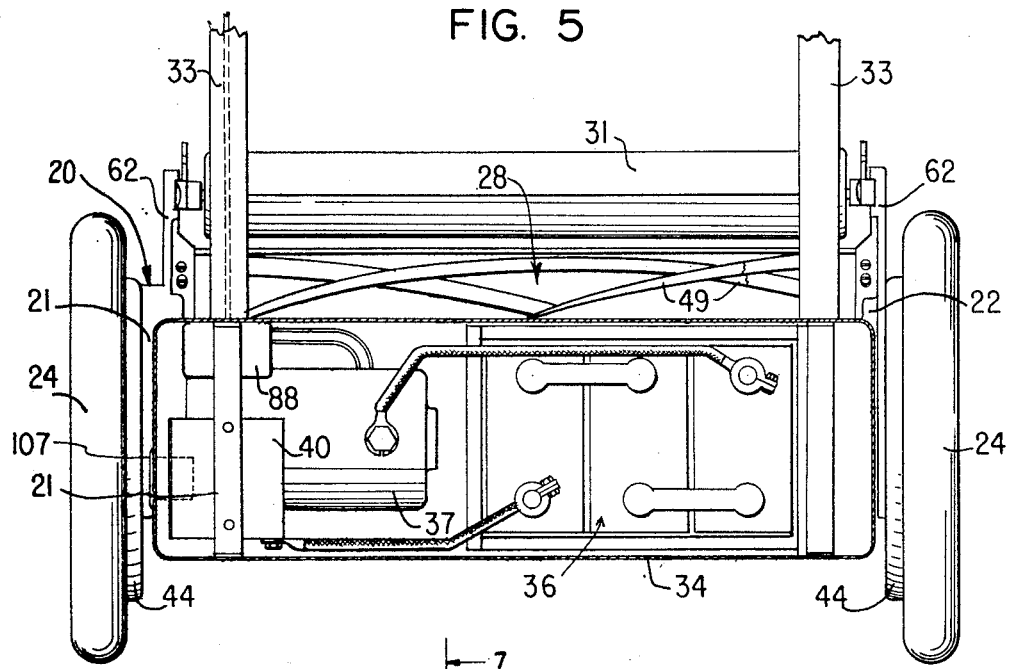
Fig. 5 is a sectional view taken substantially on line 5—5 of Fig. 6 with the operating handles cut away.
Figure 6:
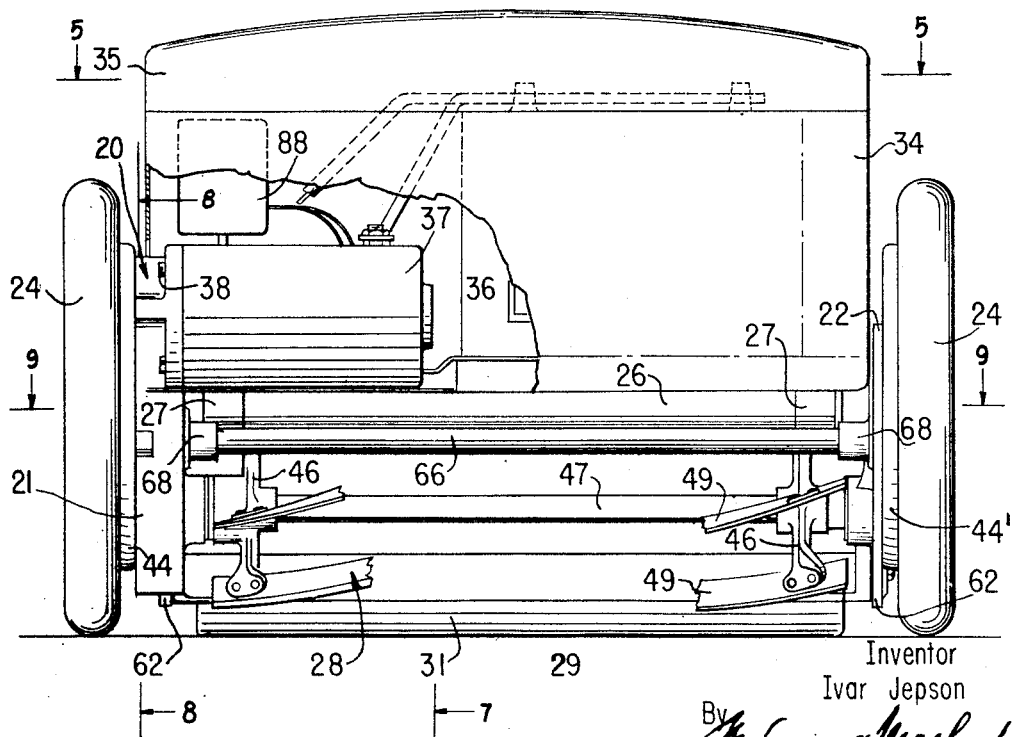
Fig. 6 is a front, partially cut-away view of the mower shown in Figure 1.
Figure 7:
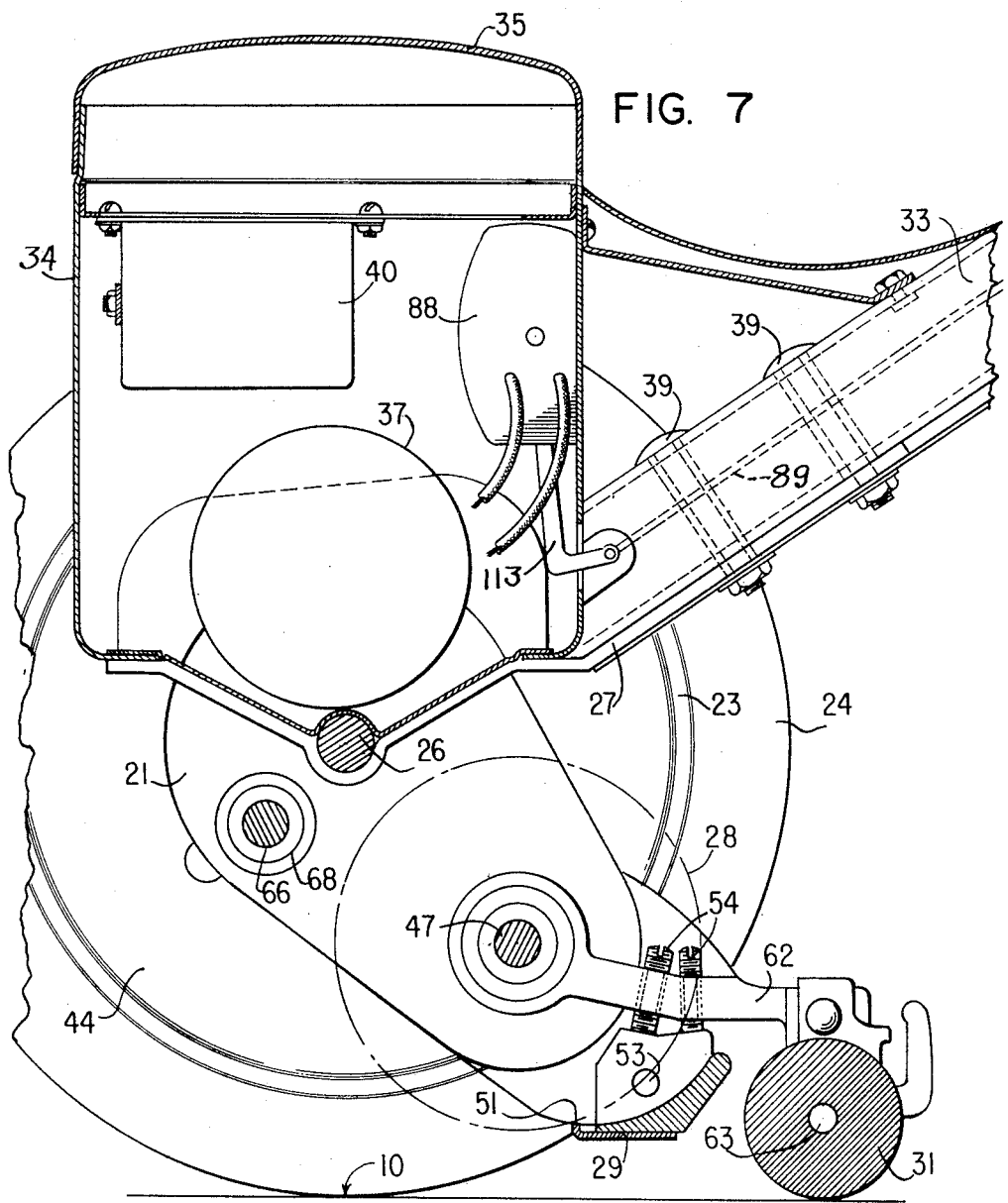
Fig. 7 is an enlarged side sectional view of the mower shown in Figure 1 taken substantially on line 7—7 of Fig. 6.

A combined motor-energizing and battery-regenerating circuit for the mower is shown in Fig. 2 and includes the armature 101 and field coil 102 of the motor 37, the control switch generally designated 103, battery 104, rectifier 105, transformer 106, and mating four-contact members 107 and 108 preferably comprising a four-prong male plug and a four-apertured female receptacle respectively. The motor 37 may be either series or shunt wound for direct current. The control switch 103 in the present instance comprises three separate break-before-make switches 109, 110, and 111, each having a pair of blades rigidly interconnected in a V-assembly. The switches 109, 110, and 111 are mechanically interlocked for parallel movement by insulating bar 112 which in turn is movable by lever 113 pivoted at 113' and connected to rod 89 which in turn is operated in push and pull operations by the button 90 at the top of one of the handles 33. In this case the switch parts are supported within a housing 88 in turn supported within the housing 34. The blades of the individual switches are movable about pivots E to three positions: a "neutral" position shown in Fig. 2 where none of the blades are in contacting positions; "mowing" position shown in Fig. 3 where blades 109A, 110A, and 111A engage contacts F; and "reel reversing" position shown in Fig. 4 where blades 109B, 110B and 111B engage contacts G. Any battery or electric current source 104 capable of storing electrical energy and running the motor 37 may be used; for example, a lead-acid storage cell battery. Any rectifier 105 capable of changing the alternating current to direct current for the recharging of the battery 104 may be employed; for example, one of the bulb type such as that known as the "Tungar" rectifier. The transformer 106 will be effective to change the available recharging current to the proper voltage for regenerating the battery. In the usual case where the recharging source is the ordinary 110 volt household current and the mower employs a six volt battery, 106 will be a 110–6 v. stepdown transformer. The charger unit designated generally as 40 in Fig. 7 may include a sub-assembly of the above-mentioned transformer 106, rectifier 105, and any other auxiliary control mechanism desired, and may be carried within the housing 34 as shown or, if preferred, may be supplied with the mower as a separate unit.

The charger 40 will usually preferably be carried on the mower in order to make the latter as self-contained as possible. In such case, the four-prong male plug member 107 will be mounted on the mower within the housing 34 and will be engageable with the four-hole plug receptacle 108, the latter being connected to an alternating current source (L1 and L2 in Fig. 2) through an extension cord which includes conductors 114 and 115. Plug members 107 and 108 will be mutually engageable in such a manner that prongs or contacts A, B, C and D on plug 107 will fit within contact holes A', B', C' and D' in plug 108, respectively.

Contacts A' and B' are shorted within the plug member 108 by means of a conductor 116 so that when the plug members 107 and 108 are mutually engaged the transformer secondary coil 117, rectifier 105, and battery 104 are joined in a series circuit which may be traced as follows: 116—117—118—105—119—120—104—121—122. This is the charging circuit for regenerating the battery 104 and the switch member 103 will be in the "nuetral" or Fig. 2 position while the battery is being regenerated. When the plug members 107 and 108 are engaged the transformer primary coil 123 is energized directly by the alternating current source L1—L2 through conductors 114 and 115.

Figure 8:
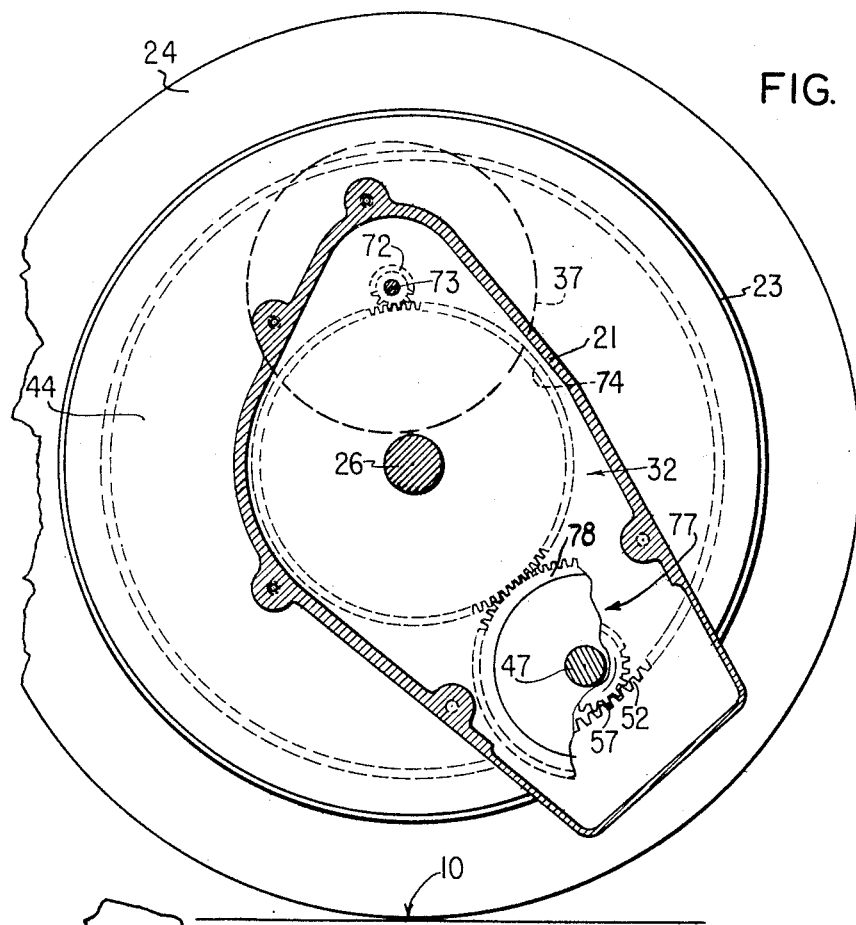
Fig. 8 is an enlarged sectional view taken on line 8—8 of Fig. 6 showing the gearing employed.

When the operating button 90 is pressed forward to move the elements of the switch 103 to the "mowing" or Fig. 3 position contacts F will be engaged by the blades 109A, 110A and 111A. The motor armature will be energized by the battery 104 through a circuit which may be traced as follows: 104—120—124—125—109A—126—101—127—121; and the motor field coil 102 will be energized through a circuit traced as follows: 104—120—124—110A—128—102—129—111A—130—121. This will energize the motor 37 to turn driving pinion 72 counterclockwise (see Fig. 8) which will drive the idler gear 74 clockwise and the driven gear 77 and pinions 57 counterclockwise (Fig. 7) to move the ground wheels forward, at the same time rotating the reel 28 counterclockwise in a forward or cutting direction. As will be seen in Fig. 11, the pinions 57 will be driven through the ratchet mechanism when the reel shaft 47 is rotated counterclockwise in this manner.

When the button 90 is pressed to move the elements of switch 103 to the "reel reversing" position shown in Fig. 4, contacts G will be engaged by switch blades 109B, 110B and 111B. The armature 101 will be energized in the same direction as before through a circuit traceable as follows: 104—120—124—125—131—109B—126—101—127—121; but the energization of the motor field coil 102 will be reversed through a circuit traceable as follows: 104—120—124—132—111B—129—102—128—110B—133—130—121 and back to battery 104. This will reverse the motor so it rotates in a clockwise direction (Fig. 8) driving the idler gear 74 counterclockwise and the driven gear 77 connected to the reel shaft 47 clockwise.

As shown in Fig. 11, clockwise movement of the reel shaft 47 will not be transmitted through the pinions 57 to the ground wheels, so that reversing of the motor direction in this manner is effective to reverse only the reel rotation and not move the ground wheels in either direction. This is an important feature of the present invention in that it facilitates the removal of foreign objects from the mower. For instance, assuming the mower is moving over a lawn in forward position cutting grass, when an object such as a stone or stick becomes caught between the reel and ledger bar. Breakage of the parts at such time will be effectively prevented by the clutch mechanism incorporated in the driven gear as shown in Fig. 10 by permitting the reel to be stopped by such overloads while the motor, idler gear and outer driven gear portion 78 continues to rotate. To eject the stone, the button 90 is simply pressed to move the switch 103 to the Fig. 4 position. This stops movement of the mower, for the ground wheels cannot be back driven through the ratchet pinions 57 as above stated; however, the reel 28 reverses, instantly ejecting the stone, and forward mowing operation is continued by returning the switch 103 to the Fig. 3 position.

As will also be noted in Fig. 11, the ratchet means employed within the pinions 57 is arranged in reverse relation to that conventionally employed in hand operated mowers so that neither the reel 28 nor the motor 37 is back driven through the ground wheels when the mower is pushed from one place of use to another with the power off, that is, with the switch 103 in the "neutral" or Fig. 2 position.

As the voltage is relatively low for batteries of the type available for this class of use, it is important that the cables be kept as short as possible and sufficiently heavy that no appreciable voltage is lost in the external circuit. For this reason, it is preferable to place the switch close to the battery and use a mechanical linkage between the switch and the operating button on the handle.

I have discovered that the rolling friction between an ordinary lawn and a loaded wheel increases steeply when the wheel diameter is reduced. For example, a given weight load applied to the small diameter roller 31 creates a much higher drag than the same weight load applied to the relatively large diameter ground wheels 23. The features of the present invention make it possible for the operator to shift all the unnecessary weight load to the large wheels by pivotally moving the operating handle and when employed in combination with the novel gearing disclosed provides a lawn mower mechanism of hitherto unknown efficiency.

By mounting the idler gear 14 so the axis of the ground wheels is within the periphery of the idler gear and preferably so their axes coincide, as shown, the gearing is compacted into a very small space. A further advantage is realized in that the motor 37 may be mounted ahead of the axle 26 in order to at least partly counterbalance the weight of the reel, ledger blade, and roller behind the axle. This is clearly shown in Fig. 8 of the drawings where the motor shaft 73 is well to the left of the axle 26 on which the ground wheels are mounted, while the axis of the reel shaft 47 is to the right of the axle 26. This serves to further reduce unnecessary load on the roller 31 which would otherwise create rolling friction which would have to be overcome by wasteful, excess power application to the wheels.

Certain conventional power operated mowers have employed driving means in which all of the torque reaction from the driving means is effective to press the trailing roller downward upon the lawn. I have discovered that this practice is wastefully inefficient in that only a portion of the total torque reaction need be applied to the roller to hold down the rear of the mower under most conditions and that any excess downward pressure on the roller merely creates a useless drag and wastes power. By mounting the motor on one of the plates which carry the roller and by means of the novel gearing disclosed I employ only about one half of the motor torque reaction to press the roller down onto the lawn and I have found this to be sufficient in practically all mowing conditions; the other half of the torque reaction is absorbed within the plate 21, i. e., neutralized because both the reel and the motor are mounted on the plate 21, and thus accounts for a large part of the improved efficiency of my mower.

While a particular form of the present invention has been shown it will be apparent that in view of the disclosures herein minor changes therein will readily suggest themselves to others skilled in the art without departing from the spirit and scope of the invention. Having thus described the invention, what is claimed as new is:

I claim:

1. A mower having frame means including a rotatable reel and a cooperating ledger bar, ground wheels supporting said frame means, self-contained driving means associated with said frame means including a motor, and means for transmitting power from said motor to said ground wheels and to said reel, an operating handle pivotally supported on said frame means and carrying a substantial part of the weight of said driving means supported above the point of engagement of said ground wheels with the ground, said motor being mounted on said frame means to the forward side of said point of engagement of said ground wheels with the ground thereby to balance the static forces on said frame means.

2. The combination recited in claim 1 in which the power transmitting means includes clutch means between the driving means and reel to permit the reel to be stopped independent of the driving means in the event an obstruction is caught between the ledger bar and reel.

3. The combination recited in claim 1 in which the power transmitting means includes ratchet means between the driving means and one of the ground wheels to permit the mower to be pushed forward by a force exerted on the operating handle without rotating the reel or back-driving the driving means, whereby the mower may be easily transported from one place of use to another.

4. A mower comprising frame means including a ledger bar mounted thereon, a rotatable reel journaled in said frame means, a pair of ground wheels supporting said frame means, self-contained driving means associated with said frame means including a battery and an electric motor adapted to be energized thereby through switch means, means for transmitting power simultaneously from said motor to one of said ground wheels and said reel, an operating handle pivotally supported on said frame means substantially at a position directly above a line joining the points of engagement of said ground wheels with the ground, said motor being mounted on said frame means and said battery being mounted on said operating handle whereby the weight of said battery is carried substantially above said line connecting the ground wheel-ground contacting points.

5. The combination recited in claim 4 in which the pivotal axis of the operating handle is coincident with the rotational axis of the ground wheels.

6. A mower having frame means with a ledger bar mounted thereon and a rotatable reel and a pair of ground wheels rotatably journaled thereon, self-contained driving means including a battery and an electric motor adapted to be energized thereby through switch means, means for transmitting power simultaneously from said motor to one of said ground wheels and said reel, an operating handle pivotally supported on said frame means substantially at a position directly above a line joining the points of engagement of said ground wheels with the ground, said motor being mounted on said frame means and said battery being mounted on said operating handle whereby the weight of said battery is carried substantially above said line connecting the ground wheel-ground contacting points, and a housing mounted on said operating handle substantially enclosing said driving means.

7. A mower having frame means for supporting a rotatable reel and cooperating ledger bar, ground wheels supporting said frame means, a trailing roller mounted on said frame means, driving means including a battery and an electric motor associated with said frame means, means for transmitting power from said driving means to said ground wheels and said reel, said power transmitting means being effective to press said trailing roller toward the ground when driving the motor forward; an operating handle pivotally supported on said frame means substantially at a position directly above a line joining the points of engagement of said ground wheels with the ground; said motor being mounted on said frame means ahead of the ground wheel axis to at least partially counterbalance the weight of the trailing roller and substantially the rest of the weight of said driving means being mounted on said operating handle.

8. A mower having frame means with a rotatable reel and a ledger bar; ground wheels; driving means; means for transmitting power from said driving means to said ground wheels and said reel; an operating handle carrying a major part of the weight of said driving means and pivotally supported on said frame means with its center weight positioned substantially directly above a line joining the area of contact of said ground wheels with the ground; said power transmitting means including an idler gear, the periphery of said idler gear encircling the axis of said ground wheels, gear means for driving said idler gear from said driving means and gear means driven by said idler gear for simultaneously driving said reel and at least one of said ground wheels.

9. The combination recited in claim 8 in which the power transmitting means includes releasable clutch means releasable at a predetermined torque required to turn the reel to permit the reel to be independently stopped in the event an obstruction is caught between the ledger bar and reel and the torque required to rotate the reel thereby increased above said predetermined torque.

10. The combination recited in claim 8 in which the power transmitting means includes ratchet means to permit the mower to be pushed forward by a force exerted on the operating handle without rotating the reel or back driving the driving means, whereby the mower may be easily transported from one place of use to another.

11. A mower having rigidly spaced side plates, an axle rotatably journaled in said side plates, ground wheels rotatably journaled on said axle on the outside of each of said plates, a self-contained power means mounted on said mower, the major weight of said power means being mounted on said axle and connected rigidly to an operating handle for pivotal movement about said axle whereby the major weight of the power means may be maintained above the point of wheel-ground contact by manually pivoting the operating handle about the axle, gearing providing a driving connection between said power means and said wheels; said gearing including a driving pinion driven by said power means, an idler gear rotatable about said axle and engaged with said driving pinion, a driven pinion engaged by said idler gear and mounted on a shaft rotatably journaled in said side plates, and a pinion on one end of said shaft engaged with a gear surface formed on one of said wheels for concurrently driving said ground wheel and said shaft; said shaft having mounted thereon a reel, and a ledger bar operatively associated with said reel.

12. A mower as recited in claim 11 wherein the gearing has a clutch associated therewith which will permit the power means to operate independently of the reel above a predetermined reel torque whereby the reel may be stopped to prevent damage to the mower when an obstruction is caught in the reel.

13. A mower as recited in claim 11 wherein the gearing has a slippable clutch which slips above a predetermined torque applied by said power means to permit the power means to operate without rotating the reel when the torque required to rotate the reel exceeds a certain predetermined value.

14. A mower comprising an axle, side plates pivotally mounted on said axle, ground wheels outwardly of said side plates and journaled on said axle, connecting means for holding said plates in rigidly spaced relation, an electric motor directly mounted to one of said plates, gearing between the motor and the ground wheels mounted on said plates, said gearing including a driving pinion on the shaft of said motor, an idler gear driven by said driving pinion and rotatably journaled about an axis coinciding with the axis of rotation of the ground wheels and independently movable with respect to the latter, a driven pinion driven by said idler gear and mounted on a rotatable shaft, said rotatable shaft having opposed portions journaled in said plates and having a reel mounted on the central portion thereof between said plates, said rotatable shaft having a pair of pinions on the ends thereof enmeshed with a pair of circularly extending internal gear surfaces formed within said ground wheels for concurrently driving said ground wheels on said shaft, and means for energizing said motor.

15. A mower having rigidly spaced side plates, an axle rotatably journaled in said side plates, ground wheels rotatably journaled on said axle on the outside of each of said plates, an electric motor directly mounted to one of said plates, means including a battery for energizing said motor mounted on said axle and connected rigidly with an operating handle, the center of weight of said energizing means adapted to be maintained substantially above the point of contact of said wheels with the ground, gearing providing a driving connection between said motor and said wheels, said gearing including a driving pinion driven by said motor, an idler gear rotatable about said axle and engaged with said driving pinion, a driven pinion engaged by said idler gear and mounted on a shaft rotatably journaled in said side plates, and a pair of pinions on the ends of said shaft engaged with corresponding gear surfaces formed on one of said ground wheels for concurrently driving said ground wheels and said shaft; said shaft having mounted thereon a reel, and a ledger bar operatively associated with said reel.

16. A mower as recited in claim 15 wherein the reel and ledger bar are mounted behind the wheel axle and a motor is mounted forward of said axle to at least partly counterbalance the weight of the reel and ledger bar.

IVAR JEPSON.

REFERENCES CITED

The following references are of record in the file of this patent:

UNITED STATES PATENTS

| Number | Name | Date |
| --- | --- | --- |
| D. 137,928 | Schofield | May 16, 1944 |
| 375,842 | Thomas | Jan. 3, 1888 |
| 975,617 | Hill | Nov. 15, 1910 |
| 1,115,350 | Vincent | Oct. 27, 1914 |
| 1,452,730 | Dremel | Apr. 24, 1923 |
| 1,469,603 | Peters | Oct. 2, 1923 |
| 1,802,358 | Smith | Apr. 28, 1931 |
| 1,870,382 | Raum | Aug. 9, 1932 |
| 2,053,535 | Schielein | Sept. 8, 1936 |
| 2,089,445 | Stauffer | Aug. 10, 1937 |
| 2,097,351 | Smith | Oct. 26, 1937 |
| 2,185,833 | Clemson | Jan. 2, 1940 |
| 2,285,230 | Roberton | June 2, 1942 |
| 2,298,135 | Klein | Oct. 6, 1942 |
| 2,300,461 | O'Dell et al. | Nov. 3, 1942 |
| 2,417,613 | Radabaugh | Mar. 18, 1947 |